Patented Aug. 23, 1938

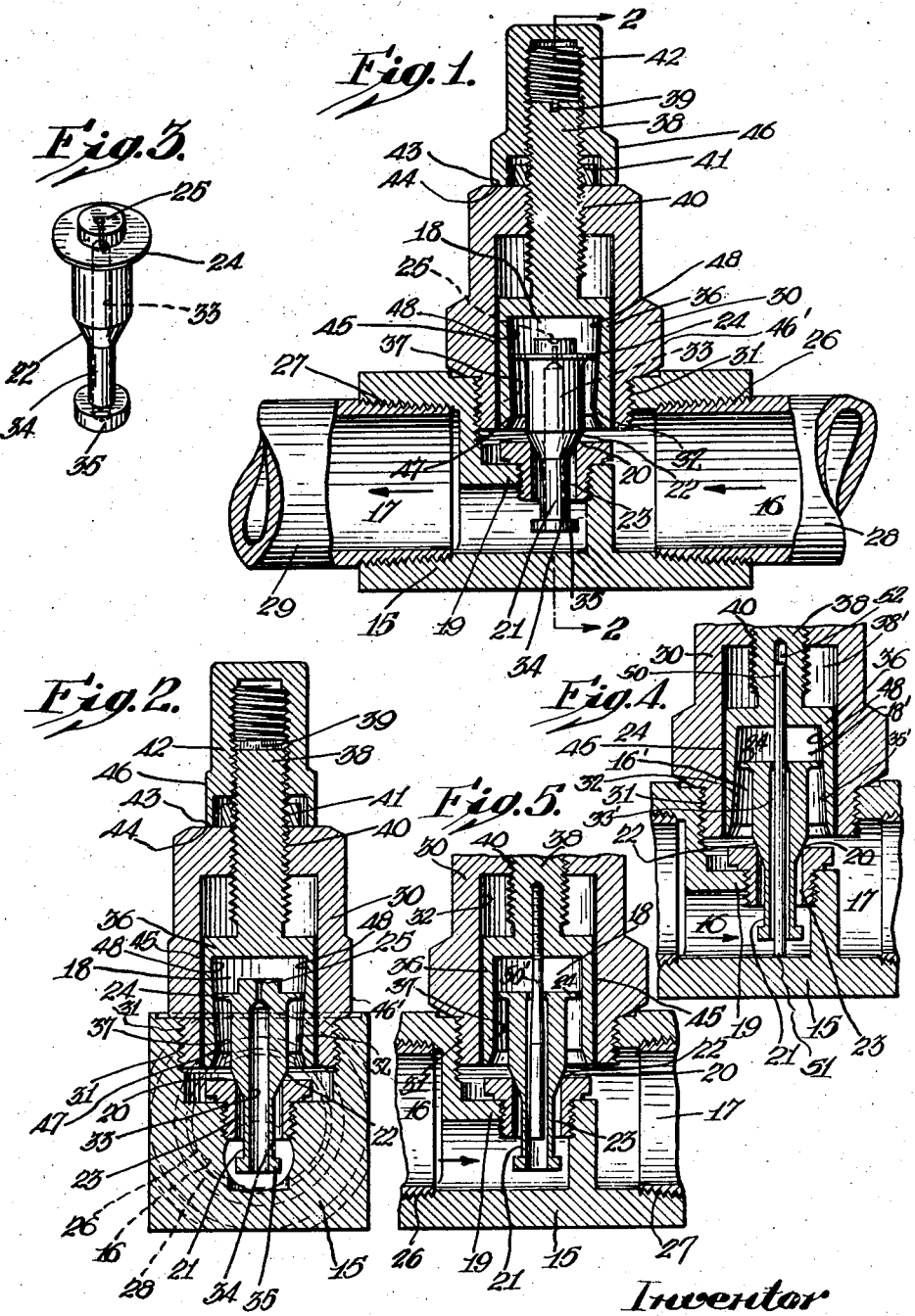

2,127,649

UNITED STATES PATENT OFFICE 2,127,649

STEAM TRAP

John F. McKee, Lansdowne, Pa., assignor to Yarnall-Waring Company, Philadelphia, Pa., a corporation of Pennsylvania Application March 17, 1934, Serial No. 716,099

26 Claims. (Cl. 137—103)

My invention relates to steam traps and methods of adjustments of the trap.

A purpose of the invention is to provide a steam trap that will be at once small, light and inexpensive to manufacture and that will effectively meet the needs of service in that, while preventing steam discharge, it will have large capacity for discharging water, for eliminating air when first turning steam into the trapped system and for maintaining the system free from air and water.

A further purpose is to provide for adjustment from the outside of leakage rates to or from a steam trap expansion chamber, thus controlling the temperature ranges and pressures at which the trap operates.

A further purpose is to provide a trap capable of use upon a wide range of steam pressures and depending for its most successful operation upon a ratio between the freedom of leakage of condensate past a piston and the freedom of leakage through a bleeder port, one leakage into and the other from a control chamber, with externally accessible means of adjustment of the ratio, alternatively adjusting either of the rates of leakage and alternatively passing the condensate in either direction.

A further purpose is to avoid necessity for close attention to the exact sizes of the parts determining the freedom of leakage ratio for the piston chamber of a steam trap, preferably by providing an axially tapering fit between the piston chamber and its piston and varying the fit by longitudinal adjustment of the piston chamber.

A further purpose is to provide for axial movement of a tapered piston chamber or tapered plug into which a perforated piston valve loosely fits, or which loosely fits a leakage perforation, so as to adjust the ratio between freedom of leakage past the piston and that through the perforation, and to adjust the said ratio controllably from the exterior to vary the performance of a steam trap.

A further purpose is to continuously draw off condensate and/or air from a steam system by a trap at a rate lower than that at which condensate ordinarily forms, to discharge any accumulated excess of condensate from the system periodically at a higher rate than that at which it forms and to adjust the periods of discharge and the rate of discharge while the trap is connected for service.

A further purpose is to ensure uniform heating of a steam trap piston and of the chamber into which the piston loosely fits so that the clearance between the two safely may be made small and may be maintained.

Further purposes will appear in the specification and in the claims.

I have elected to show a few only of the different forms of my invention, selecting forms, however, that are practical and efficient in operation and which will illustrate the principles involved.

My invention relates not only to the methods or processes involved but to mechanism by which they may be carried out.

Figure 1 is a sectional elevation illustrating a desirable embodiment of my invention.

Figure 2 is a sectional view taken upon the line 2—2 of Figure 1.

Figure 3 is a perspective view illustrating a detail of Figure 2.

Figures 4 and 5 are sectional views generally similar to Figure 2, but illustrating modifications.

Like numerals refer to like parts in all figures.

Steam systems, such as steam lines and steam devices generally, commonly contain air and condensate. The air is in the system when it is started up, and additional air enters the system in any one of many ways, as, for example, in the form of air dissolved in the feed water to the boiler. Condensate is water produced whenever steam loses its latent heat of vaporization. Both are undesirable.

My steam trap will remove both air and condensate with negligible loss of steam, normally operating continuously on condensate, keeping high pressure steam away from the trap.

The present application shows a steam trap having a piston-controlled valve with leakage both past the piston and through it, first into and then out of a control chamber formed by the piston and the walls of the piston chamber. The present construction is thus of the same general character as is shown in my copending application Serial No. 674,253, filed June 3, 1933, capable of operation exactly as the trap operates which is shown in Figures 1–3 of that application, and with the same purpose and benefits as are applicable to the construction shown in these figures. The present invention provides in addition ease of construction without the same attention to the exact sizes of leakage parts and with adjustment of operating conditions, temperatures and rates of flow while the trap is connected up not stated nor present in the structure of these figures of the pending case. These differences are due to two main features. The one is that the chamber in which the steam trap piston operates is here preferably tapered, altering the fit of the piston as it moves further into the piston chamber (in the best construction) to allow greater freedom of leakage past the piston and thus to accentuate the freedom of leakage into the space above the piston. The other feature lies in the adjustability of the size of one of the leakage ports (and thus their ratio), preferably that port provided between the piston and piston chamber by moving the piston chamber axially from the outside while the trap is in use, to adapt to the exact conditions of intended use.

In each of the different illustrated embodiments of my invention the trap includes a hollow body 15 having an interior divided into an inlet space or compartment 16, an outlet space or compartment 17 and a control space, chamber or compartment 18. A ported division wall 19 is located between the inlet and outlet compartments and a removable valve seat 20 is shown. The movable wall 21 of the control chamber is a narrow and preferably wabbly piston which carries a valve 22 controlling the flow through the valve port or passage 23.

When slightly raised the valve as shown can have lateral movement. This permits the piston to wabble and thus assists in scraping the piston chamber wall by the piston to eliminate foreign matter and thus prevent sticking.

In Figures 1–3 the control chamber 18 has throttled inlet past the piston 24 from the inlet compartment 16 and throttled outlet at 25 by an aperture through the piston and valve to the outlet compartment 17. In Figures 4 and 5 the inlet is through the piston and valve and the outlet is past the piston.

The inlet must not normally be large enough to admit condensate freely as the valve will then be held shut; nor should it pass condensate as freely as the outlet. The outlet must be smaller than would be required to pass minimal condensate. Different capacities are taken care of by adjustment to open the valve at more frequent or less frequent intervals.

It will be noted that the annulus of leakage space past the piston and between it and piston chamber is very narrow in a radial direction, much narrower than the diameter of the outlet, so that any foreign matter which passes the piston passes out freely through the aperture.

The threads 26 and 27 are intended for pipe connections 28 and 29 respectively, to a system requiring a trap to remove condensate on the one hand, and to a waste or hot well on the other.

The expansion chamber is located within a removable bonnet 30 threaded to the body at 31.

The piston 21 of the hollow movable piston-valve unit has a throttle fit with the bore 32 of the cylinder within which the piston fits.

The clearance between the piston and the inside wall of the piston chamber is important as determining the ratio of freedom of inlet flow to freedom of outlet flow to and from the control chamber. The piston-valve unit carries not only the hollow conical valve 22 and the hollow connection 33 between it and the piston but also a hollow stem 34 extending through the passage 23 and an impulse disc or flange 35 located some distance beyond the seat member.

To the extent thus far described this construction is identical with the construction of Figures 1–4 of my application previously mentioned. The same body valve seat and valve can be made interchangeable in the two.

From the presence of this disc or flange the trap would perhaps be classified as an impulse trap—and the disc is important—but the control chamber and its adjunctive leakage connections and adjustments are fundamental. The bonnet and the piston chamber carried by the bonnet, with the connections between the piston chamber and the bonnet are quite different.

The most notable differences between the piston chamber of Figures 1–4 herein and the cylinder of my application above, lie in the taper of the piston chamber and in the spacing of the piston chamber from the bonnet. In the preferred form the inlet to the expansion chamber is past the piston at the outer periphery thereof and the taper enlarges the bore inside the piston chamber as compared with the size of the bore at the outer (open) end of the bore. There is here a distinct advantage, even if the piston chamber be fixed, in that the leakage inlet, the clearance between the piston and the chamber interior then progressively increases as the piston progressively moves inwardly into the piston chamber, i. e. as the valve lifts from its seat.

However, there is a further and very considerable advantage of tapering the piston chamber, whichever way it is tapered, when this is used in conjunction with mechanism for moving the piston axially, since the fit of the piston when the valve is closed, and in fact at any selected position of the piston including its normal position in use, is then adjustable, making it possible thus to adjust the relation between the freedom of leakage past the piston and the freedom of leakage through the piston, avoiding, by the adjustment provided, the necessity for care in manufacture to make sure that the sizes of inlet and outlet leakage passages are correct and bear the desired proportion. The manufacturing "tolerances" for these two leakage paths are made much less critical. The same valve can thus be adjusted to meet different operating conditions as to steam pressure and variant quantities of condensate to be handled or temperatures at which it is to be discharged.

The fact that the volume of the chamber formed between the piston and the closed end of the piston chamber is also varied does not interfere with securing a very nice adjustment of the ratios between the two leakages and the instantaneous values of the volume of the control chamber.

The preferred form of bonnet, piston chamber and mechanism by which the piston chamber is adjusted is shown in Figures 1 to 3, and is as follows:

The bonnet is made deep enough to permit it to carry the cup 36 as a movable member in it, defining the piston chamber 37 as within this cup rather than by the walls of the bonnet itself. The position of the piston chamber is controlled by a bolt 38 rigid and preferably integral with the piston chamber, which bolt is kerfed at 39 for engagement by a screw driver and is threaded at 40 into the outer end of the bonnet so that turning of the bolt turns the piston chamber and at the same time advances or retracts the piston chamber with respect to the piston. The cup is retained in its position as ultimately set, by lock nut 41, after which the cap 42 is threaded on the bolt so that finished surfaces 43 and 44 upon the cap and the end of the bonnet seal to prevent escape of any steam which may pass between the threads.

The piston chamber is spaced from the bonnet as at 45 so that the condensate can surround the piston chamber and protect it from contact with the bonnet. The piston chamber and piston are thus maintained at substantially the same instantaneous temperatures throughout the range of condensate temperatures and a very small clearance between the piston and piston chamber will be maintained with little danger of sticking.

Both the bonnet and the cap are hexed at 46, 46' respectively, so as to facilitate screwing them to place.

Assuming that the piston chamber is in fixed position the operation would appear to be as follows:—

When the system is started increase of pressure will cause the air present to pass out through the control chamber. Very soon with the mounting pressure a mixture of relatively low temperature water and air reaches the trap which mixture shifts the piston and opens the valve, allowing the air and the first condensate to escape freely.

As the condensate discharges, high pressure steam comes nearer to the trap, and the condensate temperature and the pressure within the control chamber both progressively rise, the valve closing, if there has been proper adjustment of the valve, when temperature within the control chamber is within a few degrees of the temperature corresponding to live steam pressure, either just before or just after, steam reaches the chamber.

The ratio between the area of the piston end (subject to the closing pressure of the control chamber) and the area under the valve exposed to the back pressure beyond the valve largely controls the pressure required in the control chamber to close the valve. The higher this ratio the nearer does the requisite control chamber pressure for closure approach steam pressure and the more critical becomes the need for an exactly right relation between the inlet and outlet areas respectively for flow into and out of the control chamber. With correct adjustment of this last ratio by suitable adjustment of the longitudinal position of the tapered piston chamber the fall in temperature of the condensate becomes very small after the valve has closed and before it opens again. By the tapered piston chamber structure it is possible to obtain good results not only with the ratio of 4 to 1 between the areas of piston and valve but with many higher ratios to obtain automatic opening and closure of the valve at temperatures but a few degrees lower than steam pressure temperature.

The valve is thus controlled by change of temperature of the water immediately at the trap, opening when the reduction of pressure in the control chamber permits the pressure of the system (acting through accumulating condensate) to lift the valve and fluttering or closing as hotter condensate engages the piston and as the rush of condensate past the impulse disc forces the valve toward closure. Wobbling of the valve assists in keeping it free from sticking. Taper of the piston chamber gives progressive added pressure to reduce too fast or too much opening movement or progressively reduces pressure in the control chamber when the valve moves toward closure.

When a valve of the character shown sticks it always sticks open. The flow of condensate through the open valve tends to hold the valve open. The energy of the flowing condensate acting upon the collar, flange or disc 35 is used to overcome this tendency to hold the valve open and thus to assist in closing the valve. Observation shows that the valve remains partly open, fluttering, for long periods.

In the form shown in Figures 1-3, with the open end of the tapered piston chamber at 47 smaller than the interior at 48 and with the position of the tapered piston chamber fixed,— as it will be after adjustment—movement of the piston into the tapered piston chamber increases the annular leakage area between the piston and the tapered chamber walls with the advantage that with opening movement of the valve there is a progressive increase in the chamber pressure because of the progressive increase in the freedom of inlet to the chamber without any corresponding increase in the freedom of outlet. This progressively increasing chamber pressure with progressive opening of the valve causes the valve to shift toward closure, either closing or finding a position of equilibrium with the degree of its opening changing to accommodate the changing supply of condensate which flows from the steam system and must therefore be taken care of.

Where the steam trap is of the type shown in my previous application above referred to with a cylinder of uniform bore throughout the range of piston movement, the selection of a ratio between the diameter of the bleeder valve through the piston and operating valve and the annular space for leakage between the piston and the cylinder becomes highly important and must represent a mean accommodating the wide range of pressures to be handled by the valve rather than a proportion which will give maximum satisfaction at the pressure of the system belonging to an individual customer or for all rates of discharge of condensate which may be required. For this reason considerable discussion of this ratio and of the ratio between the main valve seat and the piston has been given in my earlier application to explain fully how satisfaction can best be secured.

It is very desirable to have low leakage through the control chamber, in that this widens the range of satisfactory trap operation, permitting the trap to operate satisfactorily during the period of lower condensate supply. For this reason it is better to have merely normal tolerances between the outside of the piston and the inside of the chamber in a closed position for commercial work. This commercial work tolerance is a clearance so low that it is desirable to guard against sticking. Slight difference in the diameter makes a wide variation when the fit is intended to be so close. There is trouble also in maintaining such a minimal spacing because of the fact that the piston heats up more rapidly than the piston chamber, causing binding and sticking due to the change in temperature accentuated by the cooling of the piston chamber on the outside. The first difficulty is overcome by the tapered piston chamber which does not require such initial accuracy but permits the fit to be the selector adjustably by longitudinal movement of the piston chamber and the second difficulty is taken care of by making the piston chamber thin and spacing it from the bonnet so that the piston chamber is heated on both sides from the condensate and has a chance to heat uniformly at the same rate as the piston and to expand at substantially the same rate as the piston.

The spacing of the piston chamber from the bonnet allows the condensate to completely surround the piston chamber. This does not affect the taper and could have been used without it. In the present case after determining upon a taper which will give a range of annular leakage areas about the piston sufficient to include satisfactory areas for the different pressures and condensate volumes to be handled the valve can be installed and the selection of the particular annular leakage area about the piston can be left to individual adjustment which interprets the adjustment in terms of satisfactory operation and in which the one who makes the adjustment does not know and does not need to know the area of annulus provided.

Though the taper in the piston chamber is sufficient to make a quite considerable difference in the size of the opening within the range of longitudinal movement of the piston where the variation in clearance for fluid passage is a matter of thousandths of an inch, the slope of the piston chamber wall with respect to the outer perimeter of the piston in the short distance represented by the thickness of the piston as a disc is negligible so that the annular passage formed between the piston and wall at any given time may be considered as of substantially uniform radial extent. As a result there is little opportunity for expansion of steam within this length represented by the thickness of the disc.

The square inlet edge to the annular passage (due to the substantial right-angle made between the nearly radial walls of the piston and the cylindrical perimeter of the piston) make this annular orifice a very poor orifice for the passage of passage water. The annular orifice is therefore relatively a better orifice for steam than for water.

As contrasted to this the discharge outlet through the piston is given rounded edges, as seen at 25, Figures 1 and 2, with the result that the coefficient of discharge for water is much improved while the coefficient of discharge for steam is little altered. It will be seen therefore applying the well-known principles of fluid flow to my construction, that I have provided poor water inlet and good steam inlet to my control compartment—but have provided relatively better water outlet with about the same steam outlet.

In normal operation of the trap when flooded with water in any possible conditions which permit steam to enter the inlet compartment these relations are of great benefit. Thus, while the inlet compartment is flooded with water the water enters the control compartment with comparative difficulty, but leaves it with comparative ease, tending to cut down the pressure in the control compartment and keeping the valve open for discharge water up to a point where the temperature of the water entering the control compartment is so high that the larger proportion of steam flashing at its outlet retards the outlet and the pressure in the control chamber is lifted, closing the valve.

On the other hand, if live steam have access to the inlet compartment, by reason of discharge of too large a proportion of the water therefrom, the live steam enters the control compartment with comparative ease, but discharges therefrom with comparative difficulty, as compared with the conditions of water entry and discharge, resulting in the quick increase in the pressure within the control compartment, with corresponding immediate closing of the valve.

Another factor relating to the operation is that with hot water (condensate) outlet through my valve there is a very much higher back pressure tending to hold the valve open than there is with steam outlet through the valve. The back pressure due to water outlet is considerably greater than that due to steam, perhaps 2 to 1. The reduction in back pressure where there has been discharge of condensate and steam has entered the control chamber affords a further protection when this excessive back pressure has been relieved, making it easier for steam in the control (expansion) chamber to close the valve.

It will be evident that the substantially square edging of the piston is very desirable on the inlet compartment side of the piston, i. e. that side toward the valve, by reason of the effect in cutting down condensate flow while not correspondingly cutting down steam flow and that from this standpoint it makes little difference whether the other edge of the piston (that facing the control compartment) be square edged or not. However it is desirable that both edges be square to avoid wedging foreign matter in between the piston and the wall of the piston chamber.

The construction shown in Figures 1–4 are full-size constructions which have actually been built and tested and which are practical on pressures from zero to 600 pounds per square inch. It has been found that the device is fully operative with a considerable range of proportions of leakage annulus about the piston and outlet through the piston including for example a ratio of 5/1000 difference between piston and piston chamber diameters to 76/1000 leakage aperture through the piston and operated to lower pressures with ratios of 3/1000 to 42/1000. These are given as general information only in view of the fact that the adjustment is made to suit the individual conditions in each case, avoiding necessity for attempted exact predetermined size of annulus and also gives opportunity to suit to the exact pressures or to abnormal rate of condensation for the pressure.

It should be noted that in making the adjustment, moving the piston chamber axially outwardly so as to make its walls more closely hug the piston decreases the vapor flow into the control chamber and in normal operation, lowers the pressure within the control chamber for the same water temperature at the trap and makes the trap valve remain open until a higher condensate temperature in the control chamber is reached at which the condensate will vaporize; while moving the piston chamber inwardly increases the water in the control chamber, increases the temperature in the control chamber and closes the valve more quickly.

The adjustment by longitudinal movement of the piston chamber or rod in all of the forms adjusts the ratio between inlet and outlet control chamber leakages and also varies the volume of the control chamber. Adjustment thus satisfies the composite of all of the changing factors.

The alternative forms illustrated in Figures 4 and 5 have been shown for the purpose chiefly of illustrating the flexibility of my invention and the fact that the piston can be tapered either way and the inlet can be from either end; also that the leakage can take place directly through the aperture at the middle of the piston and out through the piston leakage or filtering first through the piston leakage and subsequently out through the aperture.

In Figure 4 I have shown a device which I regard as less desirable than that shown in Figures 1, 2 and 3 but which nevertheless is operative and which differs from that of Figures 1–3 in three particulars. The steam entrance and outlet are reversed with respect to the directions of Figure 1, the steam entering from the left of the figure and leaving at the right and all of it which passes through the control chamber goes through the valve first: the aperture through the piston and valve is cleared and protected by a rod which also somewhat limits the wabbling of the valve, and the direction of taper of the piston chamber is reversed.

The trap body is the same. The combined valve and piston having the body 33' is exactly like the valve and piston of Figure 3 except that the aperture 38' is considerably larger than the aperture of the valve 38 and part of the aperture space is filled up by a rod 50 which passes clear through the element, and which, alternatively, may either rest as at 51 on the bottom of the interior of compartment 17 of the trap, here the inlet compartment, and fit loosely at its upper end within a bore 52 in the bonnet or may be secured within the bore 52 and not touch at the bottom. The purposes of the rod are to scour the inlet aperture so as not to permit clogging and to give the required size of leakage opening through the valve and piston without having unobstructed entrance space at any point radially large enough to allow foreign matter to pass through which will not freely pass through the leakage space from the control compartment 18' out past the piston.

Because the inlet through the piston-valve is unchanged with piston-valve opening movement the interior 35' of the piston chamber is tapered reversely from that shown in Figures 1 and 2 so as to flare toward the open end. This alters the cross section valve area ratio of inlet to outlet in the same way as the opposite direction of taper in the construction shown in Figures 1–3 but instead of increasing the inlet as there, the oulet from the control chamber is reduced here as the piston-valve lifts. It will be recognized that either form of taper permits adjustment of the leakage space past the piston between it and the piston chamber walls and thus permits exterior adjustment of the ratio between this leakage space past the piston and the leakage space allowed through the piston. The valve flutters above its seat for a good deal of its operating time, upward movements of the valve causing increase of pressure above it and downward movements of the piston cutting off the inlet to the control chamber or enlarging the outlet.

Where it is desired to use a straight cylinder with the inlet to the control chamber through the piston, adjustment from the outside can be accomplished by the construction of Figure 5, for example, where the rod 50' is tapered so that the leakage space through the piston is altered with upward piston movement. In the illustration this is inlet leakage and the taper therefore flares downwardly.

In all of the forms the trap is assembled in the general position as shown with the piston chamber at an intermediate point in its adjustment. The trap is connected into the steam line, whether for initial "setting" or in its position of use for adjustment to the needs of its service, and allowed to stay there until there has been sufficient accumulation of condensate for it to be set. The cylinder is adjusted to position where the trap is operating just right, is locked in adjusted position by the lock nut and the cap is put in place.

Except for considerable variations in the rate of accumulation of condensate in different installations the trap could be adjusted at the factory for higher pressures without need for change. However, for pressures below say 50 pounds and for very large or very low rates of accumulation of condensate further adjustment is desirable with the valve in the place of intended use.

In general an inward adjustment of the piston chamber will progressively increase the control chamber inlet to outlet area ratio which in turn will progressively reduce the temperature at which the valve will open with a progressive increase in the rate of discharge through the open valve. There will also be progressive increase in the maximum capacity of the trap. Such inward adjustment in the forms of Figures 1 and 5 will increase the inlet cross sectional area and thereby somewhat increase the rate of continuous leakage through the control chamber, while in the form of Figure 4 the inward adjustment will lessen the outlet area and thereby decrease the rate of continuous leakage through the trap.

It will be evident that the provision for concurrent uniform temperature change in the piston chamber and piston cooperates with the provision for adjusting the fit of the piston within the piston chamber and with the impulse disc for valve closure to secure, at one setting, a minimum continuous flow through the trap consistent with the trap dimensions and commercial machine shop tolerance, and an easy adjustment away from this setting to adapt the trap to operate on different conditions, and with only a very moderate increase in the continuous flow through the trap.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. The method of adjusting a leakage connection in a steam trap having inlet and outlet compartments, an outlet valve controlling flow therebetween, a tapered control chamber wall and a relatively short piston loosely fitting in the chamber and connected with said valve, there being two leakage connections, one into the chamber from the inlet past the piston and the other from the chamber to the outlet which consists in adjusting the control chamber wall axially with respect to the valve seat thereby contracting or enlarging the sectional area of one of the leakage connections with respect to the sectional area of the other and altering the volume of the control chamber for any position occupied by the piston.

2. The method of operating a steam trap having an outlet-valve-connected piston movable axially, separating an inlet compartment from a control chamber and having a leakage connection from the inlet compartment to the control compartment between the piston and chamber walls and a leakage connection from the control chamber to discharge, which consists in presenting condensate under steam pressure to the inlet compartment, thus causing condensate leakage past the piston between it and the piston chamber and in varying the leakage past the piston with different extents of valve opening by varying the diameter of the control chamber at the different positions occupied by the piston.

3. The method of operating a steam trap having an outlet-valve-connected piston operating axially of a piston chamber, with the piston separating an inlet compartment from a control chamber formed cooperatively by the piston and piston chamber and having a leakage connection from the inlet compartment past the piston to the control chamber and a leakage connection from the control chamber to discharge, which consists in presenting condensate under steam pressure to the inlet compartment, thus causing condensate leakage past the piston between it and the control chamber, in increasing the sectional area of the leakage connection past the piston with opening movement of the valve and for all movements of the valve adjusting the sectional area of the leakage connection past the piston in any given position by alteration of the relative position of piston and piston chamber along the axis of the piston chamber, the operation with inlet chamber flow of condensate being to increase progressively the pressure within the control chamber as the condensate temperature progressively rises, as distinguished from a popping action in which successive accumulation of condensate at the inlet chamber successively shut off passage of steam to the control chamber, the resultant reduction of pressure within the control chamber permitting the piston to lift suddenly opening the valve for an exhaust of the accumulated condensate.

4. In connection with a steam trap, comprising a body having outlet and inlet compartments, a control chamber connected with the inlet compartment, a piston in the control chamber and a valve connected with the piston and cooperating with a valve seat between the inlet and outlet compartments, and the said control chamber having a leakage inlet between the piston and the chamber walls and a leakage outlet from the control chamber into the outlet compartment, the art which consists in maintaining the piston and both the inside and outside of the control chamber at substantially the same temperature by engagement of condensate with them and in varying the clearance of the piston in the control chamber by reason of movement of the piston axially within the control chamber to vary leakage past the piston, increasing the ratio of leakage inlet to leakage outlet when the valve is open as compared with that when the valve is closed.

5. The method of securing the most desirable relation between the sectional passage areas respectively of leakage of fluid into and leakage of fluid from the control chamber of a steam trap having a chamber the fluid pressure in which controls discharge of condensate by controlling the opening and closing of a valve between inlet and outlet compartments of the trap, and in which the control chamber is bounded by a piston and by the sides and closed end of an internally tapered control chamber, which consists in admitting fluid into and withdrawing the fluid from the control chamber through leakage passages one of which is the clearance between the piston and the tapered interior of the control chamber and in determining the clearance between the piston and the control chamber initially by trying out the trap in a steam line while altering the position of the control chamber from the outside to change the clearance between the piston and the control chamber.

6. The method of operating a steam trap having an outlet-valve-connected piston operating axially of a control chamber, said piston separating an inlet compartment from a control chamber and having a leakage passage past the piston to the control chamber and a leakage passage from the control chamber to discharge, which consists in presenting condensate under steam pressure to the inlet compartment, thus causing condensate leakage past the piston between it and the control chamber, in altering the ratio between the areas of inlet to and outlet from the control chamber with opening movement of the valve and at the same time increasing the resistance to discharge flow through the valve by excessive opening movement, the operation with the inlet chamber flow of condensate being to increase progressively the pressure within the control chamber as the condensate temperature progressively rises, as distinguished from a popping action in which successive accumulation of condensate at the inlet chamber successively shut off passage of steam to the control chamber, the resultant reduction of pressure within the control chamber permitting the piston to lift suddenly opening the valve for an exhaust of accumulated condensate.

7. The method of securing the most desirable relation between the areas respectively of leakage of fluid into and leakage of fluid from the control chamber of a steam trap having a chamber the fluid pressure in which controls the opening and closure of a valve between inlet and outlet compartments of the trap for discharge of condensate and in which the control chamber is bounded by a piston and by the sides and closed end of an internally tapered piston chamber, the clearance space between the piston and the tapered interior of the chamber providing the passage for leakage into the control chamber and the leakage passage from the control chamber comprising a passage through the piston and valve, which consists in adjusting the piston chamber axially so that with increased valve opening there will be variation in the area of leakage past the piston, causing the pressure in the control chamber to rise more rapidly than would otherwise be the case and tending to close the valve earlier than otherwise, and in assisting closing movement of the valve by the pressure of fluid passing through the valve.

8. In a steam trap, a body having inlet, control and outlet compartments, the control compartment comprising largely an internally tapered piston chamber, a piston lying within the piston chamber, the piston completing the control compartment, a valve connected with the piston and controlling the flow of fluid between the inlet and outlet compartments, there being leakage from the control compartment to discharge, and means for adjusting the piston chamber axially with respect to the piston for varying the rate of leakage as between the inlet and outlet rates of fluid flow.

9. A steam trap comprising a body having inlet and outlet compartments, an internally tapered piston chamber and a unitary member comprising a piston and a valve, the said member having an aperture longitudinally through the piston and through the valve, the piston being loose in the piston chamber, thus allowing leakage through the piston and valve and past the piston and using the portion of the piston chamber beyond the end of the piston as a control compartment for the trap.

10. In a steam trap a body having inlet and outlet compartments and a valve seat between them, a combined thin piston and valve apertured to provide leakage through both of them, an internally tapered piston chamber within which the piston operates and with which the piston forms a control chamber, the piston fitting loosely in the piston chamber to allow leakage past it and means for axially moving the tapered cylinder with respect to the piston to adjust the looseness of the initial fit of the piston in the piston chamber.

11. In a steam trap a body having inlet and outlet compartments and a valve seat between them, a combined piston and valve apertured to provide leakage through both of them, an internally tapered piston chamber, open at one end, within which chamber the piston operates and with which the piston forms a control chamber, the piston fitting loosely in the piston chamber to allow leakage past it and the taper of the piston chamber giving greatest diameter at the open end of the piston chamber.

12. In a steam trap a body having inlet and outlet compartments and a valve seat between them, a combined thin edged piston and valve apertured to provide leakage through both of them, an internally tapered piston chamber closed at one end within which chamber the piston operates and with which the piston forms a control chamber, the piston fitting loosely in the piston chamber to allow leakage past it, and the taper of the piston chamber giving greatest diameter at the closed end of the piston chamber.

13. The sub-combination adapted for use in a steam trap comprising a longitudinally movable internally tapered piston chamber, means for adjusting it longitudinally, an apertured piston fitting in said piston chamber, movable therein and having its clearance in said piston chamber altered with relative movement of the piston chamber and piston, for any given piston position and an outlet valve controlled by movement of the piston and apertured in communication with the aperture of the piston.

14. In a steam trap, a body having inlet and outlet compartments and a valve seat between them, a combined apertured piston and loosely mounted valve engaging the valve seat, the looseness of the mounting of the valve permitting wabbling of the piston when the valve is off its seat, the aperturing allowing leakage through the piston and then through the valve, an internally tapered piston chamber within which the piston operates and with which the piston forms an expansion chamber, the piston fitting loosely in the piston chamber to allow leakage past it, and means for mounting the piston chamber so as to permit access of condensate to its exterior and interior and means for axially adjusting the piston chamber to vary the fit between the piston periphery and the piston chamber.

15. A steam trap having inlet and outlet compartments and a passage between them, a valve seat in the passage, an apertured valve therein, a disc on the valve adapted to move the valve toward closure with flow of condensate past the valve, an apertured piston connected with the valve and the piston aperture being in communication with the valve aperture, providing leakage through them, a piston chamber having a tapered interior varying the fit of the piston with axial movement of the chamber, a bonnet within which the piston chamber is mounted and from whose interior it is spaced, and threaded means for supporting the piston chamber in different positions axially of the piston to give variant loose connection of the piston with the piston chamber and to further vary the loose connection with opening and closing movement of the piston valve.

16. In a steam trap a body having inlet and outlet compartments and a valve seat between them, a combined piston and valve apertured to provide leakage through both of them, an impulse disc carried by the valve at the part thereof farthest from the piston and an internally tapered piston chamber within which the piston operates and with which the piston forms a control chamber, the outside of the piston chamber being exposed to the condensate so that it is heated concurrently with the heating of the inside of the piston chamber.

17. In a steam trap a body having inlet and outlet compartments and a valve seat between them, a combined piston and valve apertured to provide leakage through both of them, an internally tapered piston chamber within which the piston loosely operates and with which the piston forms a control chamber and impulse means beyond the valve from the piston to draw the piston to a position where the inlet to the control chamber is reduced by reason of flow of condensate through the valve.

18. In a steam trap a body having inlet and outlet compartments and a valve seat between them, a combined piston and valve apertured to provide leakage through both of them, a piston chamber within which the piston operates and with which the piston forms a control chamber, the piston having a thin edge and affording clearance of the piston from the piston chamber and the aperture providing leakage passages one into the control chamber and the other from the control chamber, means for adjusting the piston chamber axially and tapered means movable with the piston chamber to alter the size of one of the passages.

19. In a steam trap a body having inlet and outlet compartments and a valve seat between them, a combined piston and valve apertured to provide leakage through both of them, an internally tapered piston chamber within which the piston operates axially and with which the piston forms a control chamber, there being inlet and outlet fluid communication between the inlet chamber and the control chamber and between the control chamber and the outlet compartment, means for moving the piston chamber longitudinally from the outside of the trap and means for mounting the piston chamber free from the outer trap walls whereby condensate being trapped is freee to surround and to enter the piston chamber and the temperature of the piston chamber and piston are equalized.

20. In a steam trap, a body having inlet and outlet compartments and an opening between them, a valve seat about the opening, an internally tapered piston chamber axially in line with the valve seat, means for moving the piston chamber toward and from the valve seat and a piston unit comprising a piston adapted to fit variantly in the piston chamber with variant piston chamber positions, and an outlet valve connected therewith, the unit being apertured to permit leakage through it, and an impulse disc beyond the valve seat in the direction of fluid flow and in the path of discharge through said valve, adapted to restrain the opening movement and assist in closing movement of the valve.

21. A valve body having inlet and outlet compartments and a valve seat surrounding an opening between the compartments, a bonnet connected with the inlet compartment, a piston chamber in the bonnet, means for axially adjusting the piston chamber toward and from the valve seat and an apertured piston unit within the piston chamber comprising a piston, a valve connected with the piston, means in line with discharge through the valve seat adapted to urge the valve toward closure and tapered means for adjustably changing the fit of the piston in the piston chamber.

22. A steam trap body having inlet and outlet compartments and a valve seat between the compartments, a unitary member comprising a piston and a valve, the said member having an aperture extending longitudinally through the piston and through the valve and the valve adapted to engage the seat, a rod in the aperture adapted to guide the piston and prevent clogging of the aperture and with respect to which rod the piston moves and walls forming a piston chamber surrounding the rod and loosely surrounding the piston.

23. A steam trap body having inlet and outlet compartments and a valve seat between the compartments, a valve engaging the seat, a piston rigid with the valve, both the valve and piston having apertures in communication with each other, a rod in the piston aperture adapted to prevent clogging of the piston aperture and with respect to which rod the piston moves, and a piston chamber surrounding the rod and loosely surrounding the piston, the rod being tapered and adjustable from the outside to adjust the aperture opening and alter the extent of opening with longitudinal movement of the piston.

24. A steam trap comprising a body having inlet and outlet compartments, a valve seat between them and a bonnet connected with the inlet compartment, an internally tapered piston chamber within the bonnet, means for adjusting the piston chamber longitudinally with respect to the bonnet, a piston in the piston chamber cooperating with the piston chamber to form a control chamber beyond the piston, the clearance between the piston and the piston chamber providing leakage between the piston and the piston chamber, a valve adapted to engage the valve seat, the piston and valve being apertured and a rod passing through the aperture in the piston and valve, the fit between the piston and the tapered piston chamber being altered by axial movement of the piston chamber.

25. A steam trap comprising a body having inlet and outlet compartments, a valve seat between them and a bonnet connected with the inlet compartment, a piston chamber closed at one end and movable within the bonnet, means for adjusting the piston chamber longitudinally with respect to the bonnet, a piston in the piston chamber adapted by its clearance to provide leakage between the piston and the piston chamber into a control chamber formed between the piston and the end of the piston chamber, a valve adapted to engage the valve seat, the piston and valve being apertured and a rod passing through the aperture in the piston and valve, the fit between the rod and aperture being altered by taper variation due to axial movement of the piston chamber.

26. A valve body having inlet and outlet compartments and a valve seat between, a bonnet connected with the inlet compartment, a piston chamber in the bonnet, means for axially adjusting the piston chamber toward and from the valve seat and an apertured piston unit within the piston chamber comprising a piston and a valve connected with the piston, means in line with discharge through the valve seat adapted to urge the valve toward closure and tapered means for affecting the size of the aperture by longitudinal adjustment of the piston chamber.

JOHN F. McKEE.